United States Patent
Stickle

(10) Patent No.: US 9,201,883 B1
(45) Date of Patent: Dec. 1, 2015

(54) REMOTE FILE ARCHIVING USING PACKAGE FILES

(71) Applicant: Amazon Technologies, Inc., Reno, NV (US)

(72) Inventor: Thomas C. Stickle, Saint James, NY (US)

(73) Assignee: Amazon Technologies, Inc., Reno, NV (US)

( * ) Notice: Subject to any disclaimer, the term of this patent is extended or adjusted under 35 U.S.C. 154(b) by 89 days.

(21) Appl. No.: 13/647,316

(22) Filed: Oct. 8, 2012

(51) Int. Cl.
*G06F 7/00* (2006.01)
*G06F 17/00* (2006.01)
*G06F 17/30* (2006.01)

(52) U.S. Cl.
CPC .................. *G06F 17/30067* (2013.01)

(58) Field of Classification Search
USPC .......................................................... 707/693
See application file for complete search history.

(56) References Cited

U.S. PATENT DOCUMENTS

| | | | |
|---|---|---|---|
| 6,874,035 B1* | 3/2005 | Andre et al. .................. | 709/246 |
| 2003/0185393 A1* | 10/2003 | Kii et al. ........................ | 380/201 |
| 2006/0184505 A1* | 8/2006 | Kedem et al. ..................... | 707/1 |
| 2006/0212539 A1* | 9/2006 | Palevich et al. ............... | 709/217 |

OTHER PUBLICATIONS

GitHub, "epatel / pinch-objc," <https://github.com/epatel/pinch-objc>, 3 pages (accessed Aug. 7, 2012).
Edward Patel, "Now in ObjC: Pinch—Retrieve a file from inside a zip file, over the network!," <http://forrst.com/posts/Now_in_ObjC_Pinch_Retrieve_a_file_from_inside-I54>, 3 pages (accessed Aug. 14, 2012).
WinZip, "WinZip File Compression Software," <http://www.winzip.com/win/en/prodpagewz.htm>, 2 pages (accessed Aug. 14, 2012).

* cited by examiner

*Primary Examiner* — Alex Gofman
*Assistant Examiner* — Muluemebet Gurmu
(74) *Attorney, Agent, or Firm* — Klarquist Sparkman, LLP

(57) ABSTRACT

Remote file archiving is provided using package files. A request can be sent for a raw file stored within a package file. The request can be sent by a computing device to a remote storage service. The requests can comprise a location of the raw file within the package file. The raw file can be received and unmarshaled. Unmarshalling the raw file can comprise uncompressing and/or decrypting the raw file. Meta-data can be requested and used to determine a location of the raw file. Raw files can be extracted and provided. For example, a request for a raw file can be received. The raw file can be extracted from a package file and provided for download. The raw file can be in an archived state, such as compressed and/or encrypted.

27 Claims, 7 Drawing Sheets

REMOTE FILE ARCHIVING USING PACKAGE FILES

BACKGROUND

With the ever increasing usage of remote data storage facilities, accessing stored data in a quick and efficient manner is becoming more important. For example, a user of a remote data storage facility may store multiple files at a remote storage facility in a package format, such as a zip file format.

In some situations, a user may want to retrieve just one file from the archive. In order to retrieve just the one file, the user may need to download the entire archive and extract just the one desired file from the archive. Requiring the user to download the entire archive if just one or a few files in the archive are needed can be inefficient in terms of time, bandwidth, and cost. For example, remote data storage facility may charge based on the amount of data that is downloaded or uploaded.

Therefore, there exists ample opportunity for improvement in technologies related to remote file archiving.

DETAILED DESCRIPTION

Overview

Figure 1:
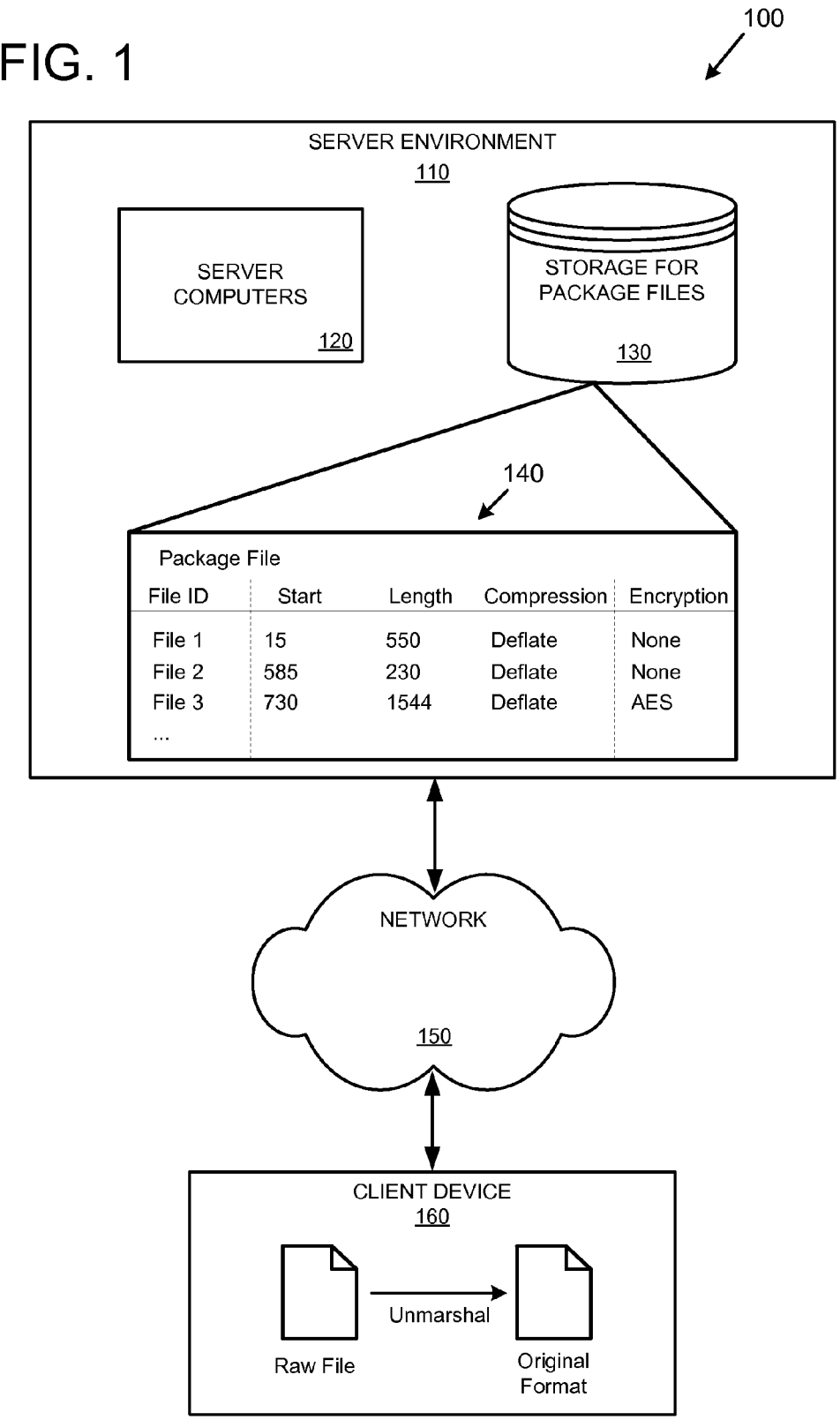
FIG. 1 is a block diagram of an example remote file archiving environment.

The following description is directed to techniques and solutions for remote file archiving for package files. The techniques and solutions can provide for remotely retrieving raw files from package files and/or remotely adding raw files to package files. For example, allowing clients to remotely retrieve and/or add individual raw files from/to package files can be more efficient than downloading and/or uploading the entire package file to access one or more of the raw files stored within the package file.

For example, raw files can be remotely extracted from package files using meta-data. The raw files can be retrieved and unmarshaled. Raw files can also be remotely added to a package file.

In some embodiments, a package file can be remotely accessed and manipulated. For example, a computing device can obtain meta-data describing a package file and the raw files stored within the package file (e.g., information describing the contents, structure, and/or layout of the package file), send a request for one or more of the raw files, receive the one or more raw files, and unmarshal the one or more raw files (e.g., locally at the computing device).

In some embodiments, a storage service can provide access to a package file. For example, the storage service can receive requests from remote computing devices for raw files stored by the storage service within package files. The storage service can extract the raw files (e.g., based on location information for the raw files) and provide them to the remote computing devices. The storage service can provide meta-data to the remote computing devices describing the package files. The storage service can also receive requests to add, modify, or replace raw files within package files.

For example, consider a data storage service (e.g., cloud-based data storage service) that stores data (e.g., files or objects) for customers. Such a data storage service typically charges for the amount of data stored, the duration of storage, and the bandwidth associated with uploading and downloading the data. In order to reduce these costs, a customer may compress data to be stored using an archive format, such as the zip archive format. Once compressed, the data in the archive format (the package file) can be uploaded and stored at a reduced cost due to the reduced file size. Once the compressed package file is stored by the data storage service, it can be remotely accessed without having to download the entire package file. For example, the customer can retrieve an individual raw file from the package file. Because the raw file is still compressed, less bandwidth is required to download the raw file. Similarly, the customer can upload an individual raw file (e.g., which has been compressed and/or encrypted) to add to the package file (or replace an existing file in the package file).

As an example, a customer may have a zip package file containing thousands of small map image files covering the U.S. If the customer wants to access the map image files for the state of Rhode Island, the customer can retrieve only the raw map image files for the state of Rhode Island (e.g., from a remote data storage service) and unmarshal them (e.g., uncompress them and use them to display a map image to a user). Accessing only the needed raw files can be more efficient than downloading the entire zip package file and extracting the desired map image files.

Package Files

In any of the embodiments described herein, a package file refers to a file that stores a collection or group of files (e.g., data objects) in a package file format. The collection or group of files stored in a package file can be individual files, other types of package files, and/or other types of data objects. For example, a package file can store a plurality of individual files. A package file can also be referred to as an archive file.

The files in a package file can be encrypted and/or compressed. For example, consider a single package file that comprises a plurality of individual files. The plurality of individual files can be compressed (e.g., compressed separately and/or compressed together). The plurality of individual files can also be encrypted (e.g., encrypted separately and/or encrypted together). For example, one or more of the individual files can be separately encrypted, compressed, and stored as part of the package file.

A package file uses a format (a package file format) to store its collection of files. For example, a package file can be in the zip archive format, the RAR archive format, the gzip archive format, or a different archive format.

For example, a package file in the zip archive format stores its individual files as contiguous ranges of bytes within the zip package file. The zip package file comprises a central header that specifies information about each individual file in the zip package file, including file name, compressed and uncompressed file sizes, location of the file in the zip package file, and other information.

A package file can be stored as a single physical file (e.g., a single file stored on a hard disk or a distributed or virtual file). Alternatively, a package file can be split into two or more physical files (e.g., split between two files on a single hard drive or split between a first file on a first hard drive and a second file on a second hard drive). For example, a large package file may be split between two or more physical files stored on different storage devices, or a large package file may span multiple storage devices.

Raw Files

In any of the embodiments described herein, a raw file refers to an individual file of a package file, and a package file can store a plurality of raw files. A raw file is stored in a package file in an archived state. For example, a raw file can be compressed, encrypted, and/or otherwise transformed when stored in the package file. When a raw file is extracted from a package file as a raw file, it retains its archived, untouched, state (e.g., it is still encrypted, compressed, marshaled, or otherwise transformed as it was stored in the package file).

A raw file can be extracted from a package file. For example, a raw file can be extracted from a package file by locating the raw file within the package file (e.g., using header information) and extracting the data for the raw file (e.g., by extracting a range of bytes within the package file corresponding to the raw file). The raw file can then be stored as a separate file and/or sent to another device for storage and/or processing.

When a raw file is extracted from a package file, the raw file's contents are extracted without any additional processing to change the state of the raw file (e.g., without uncompressing, decrypting, and/or transforming). For example, when a raw file that is stored in a package file in a compressed state is extracted, retrieved, and/or stored as a raw file, it is still compressed.

Meta-Data

In any of the embodiments described herein, meta-data can be used when manipulating package files and raw files. Meta-data refers to information that describes the contents of a package file, the package file format or structure, and/or the individual raw files stored within the package file.

Meta-data can be stored within a package file. For example, in some archive formats, such as the zip archive format, directory and header information meta-data is stored within the zip package file. Meta-data can also be stored separately. For example, a package file can be stored as a first file with its associated meta-data being stored as a separate second file. Meta-data can also be stored in other types of data storage facilities (e.g., in a database or data store).

Meta-data can be stored directly and/or derived from directly stored information. For example, file names of raw files can be stored directly in the meta-data. Other information, such as byte ranges for raw files, can be derived (e.g., from file offsets and file length information which is stored directly).

In some embodiments, meta-data comprises a location of the raw file within the package file. For example, the location can comprise a start position of the raw file (e.g., an offset from the beginning of the package file or a relative offset) and a length of the raw file. The location can also comprise a range of bytes of the raw file within the package file (e.g., a range of bytes, including a start location and an end location, relative to the beginning of the package file). The location can also comprise a location of at least a portion of the raw file (e.g., a pointer to a start position or block of the raw file, such as a start block of a block data store, or a location of table pointing to blocks of data). The location can also comprise a file identifier of the raw file (e.g., that can be translated into a byte range of the raw file by a storage service).

In some embodiments, meta-data comprises some or all of the following information (either directly or derived) for raw files stored in the package file:

An identifier of the raw file (e.g., a file name, unique file identifier, etc.)

A start position of the raw file within the package file (e.g., a file offset)

A length of the raw file (e.g., a number of bytes of the file as stored in the package file)

an indication of an encryption type and/or a compression type of the raw file

In a specific embodiment, the meta-data comprises the following information describing the raw files in the archive file: filename, filename start, filename length, file start byte, file end byte, and compression method. For example, the following table (Table 1) is an example set of meta-data describing information for three files using this specific embodiment.

TABLE 1

| Filename | Filename start | Filename length | File start byte | File end byte | Compression method |
|---|---|---|---|---|---|
| NewYork | 30 | 7 | 49 | 960 | 00 (Normal) |
| Florida | 1024 | 7 | 1031 | 36000 | 11 (Fast) |
| California | 36600 | 10 | 37000 | 64000 | 01 (Max) |

Unmarshalling Raw Files

In any of the embodiments described herein, raw files can be unmarshaled to generate the raw files in their original formats. In some embodiments, unmarshalling is performed after the raw file has been remotely retrieved from a package file (e.g., extracted by, and downloaded from, a server environment).

When a file is added to a package file, the file can be processed. The processing can comprise, for example, encrypting the file, compressing the file, and/or otherwise transforming the file (e.g., transcoding, changing the format, etc.). The processed file is stored as a raw file in the package file.

After a raw file has been extracted from a package file, the raw file can be unmarshaled to convert the raw file back to its original format. For example, if the raw file is compressed, the unmarshalling can comprise uncompressing the raw file to restore the raw file to its original uncompressed format.

Unmarshalling a raw file can comprise performing various operations. For example, unmarshalling a raw file can comprise uncompressing the raw file, decrypting the raw file, and/or performing other operations (e.g., transcoding the raw file, converting the format of the raw file, etc.).

Unmarshalling a raw file can be performed by a computing device after the computing device retrieves (e.g., downloads) the raw file from a remote server environment. For example, a computing device can retrieve the raw file from a cloud storage service (e.g., a cloud object store) and locally unmarshal the raw file.

Remote File Archiving Environment

In any of the embodiments described herein, an environment can be provided for remote file archiving using package files. For example, the environment can comprise a server environment (e.g., a storage service environment) for storing package files and responding to requests for meta-data and/or raw files from other computing devices.

FIG. 1 is a diagram depicting an example environment 100 supporting remote file archiving using package files. The example environment 100 comprises a server environment 110. For example, the server environment 110 can represent a storage service environment (e.g., a cloud storage service), such as a cloud-based object store. The server environment 110 comprises computer servers 120 and storage 130 (e.g., databases and/or other storage repositories).

The storage 130 stores package files. A package file can store a plurality of raw files in an archive format. An example package file 140 is depicted in FIG. 1. The example package file 140 includes three raw files: File 1, File 2, and File 3. The example package file 140 also stores meta-data describing raw files stored by the package file. The meta-data includes information describing each of the raw files. The meta-data information depicted for the example package file 140 includes a file identifier (e.g., file name), start position (e.g., offset in bytes to the beginning of the raw file within the archive file), length (e.g., length of the file in bytes), compression type (the type of compression, if any, used to compress the raw file), and encryption type (the type of encryption, if any, used to encrypt the raw file). For example, the raw file "File 1" has a start position of 15 bytes, a length of 550 bytes, is compressed using the deflate compression algorithm, and is not encrypted. The meta-data depicted for package file 140 is a simplified representation of meta-data (e.g., a simplified version of meta-data for a zip archive format). Depending on implementation details, different meta-data can be used (e.g., different types of meta-data information and/or meta-data corresponding to a different archive format) than the simplified meta-data depicted for package file 140.

The example environment 100 also comprises a client computing device 160 that can communicate with the server environment 110 via a network 150 (e.g., comprising the Internet). The client computing device 160 can be any type of computing device (e.g., a server computer, desktop computer, laptop, tablet, or another type of computing device) that connects to the server environment 110 to perform remote file archiving operations. The server environment 110 supports communication with any number of client computing devices (e.g., 160). In addition, the server environment 110 can communicate with client computing devices located within the server environment 110 (e.g., connected by a local or internal network).

The client computing device 160 can perform operations to retrieve a raw file from a package file stored by the server environment 110. For example, the client computing device 160 can send a request to the server environment 110 for a raw file (e.g., for one of the raw files stored in package file 140). The client computing device 160 can request the raw file using meta-data associated with the package file (e.g., meta-data stored locally by the client computing device 160 or meta-data obtained from another source, such as from the server environment 110). For example, the client computing device 160 can send a request to the server environment 110 for a raw file where the request comprises a location of the raw file (e.g., start position and offset, a range of bytes, a position relative to another raw file, a file identifier that is translated to a location within the package file by the server environment 110, etc.).

When the client computing device 160 receives the raw file from the server environment 110, the client computing device 160 can unmarshal the raw file to create an original format of the raw file. For example, if the client computing device 160 retrieves the raw file, File 3, from the package file 140, the client computing device 160 can unmarshal File 3 by uncompressing and decrypting File 3, and save the resulting File 3 in its original uncompressed and decrypted format (e.g., the original format or state of File 3 before it was compressed and encrypted and added to the package file 140).

Allowing the client computing device 160 to retrieve selected raw files from the server environment 110, without having to download the entire package file, saves resources (e.g., bandwidth, time, etc.). In addition, retrieving raw files in their archived state (e.g., compressed and/or encrypted) can further save resources. For example, retrieving a raw file in a compressed state can reduce the bandwidth needed to transfer the raw file. The raw file can then be unmarshaled at the client computing device 160 to return the raw file to its original format.

The client computing device 160 can also add and/or update raw files stored in package files by the server environment 110. For example, the client computing device 160 can compress a new file, creating a new raw file, File 4. The client computing device 160 can send the new raw file, File 4, to the server environment 110, which can add the new raw file to the package file 140. Similarly, the client computing device 160 can create a replacement or modified file (e.g., a replacement or modified raw File 3) and send the replacement or modified file to the server environment 110 for storage in the package file 140. The server environment 110 can receive modified meta-data associated with the updated package file (e.g., package file 140) accordingly.

Remotely Retrieving Raw Files from Package Files

In any of the embodiments described herein, raw files can be remotely retrieved from package files. The retrieved raw files can be unmarshaled to generate the raw files in their original formats.

Figure 2:
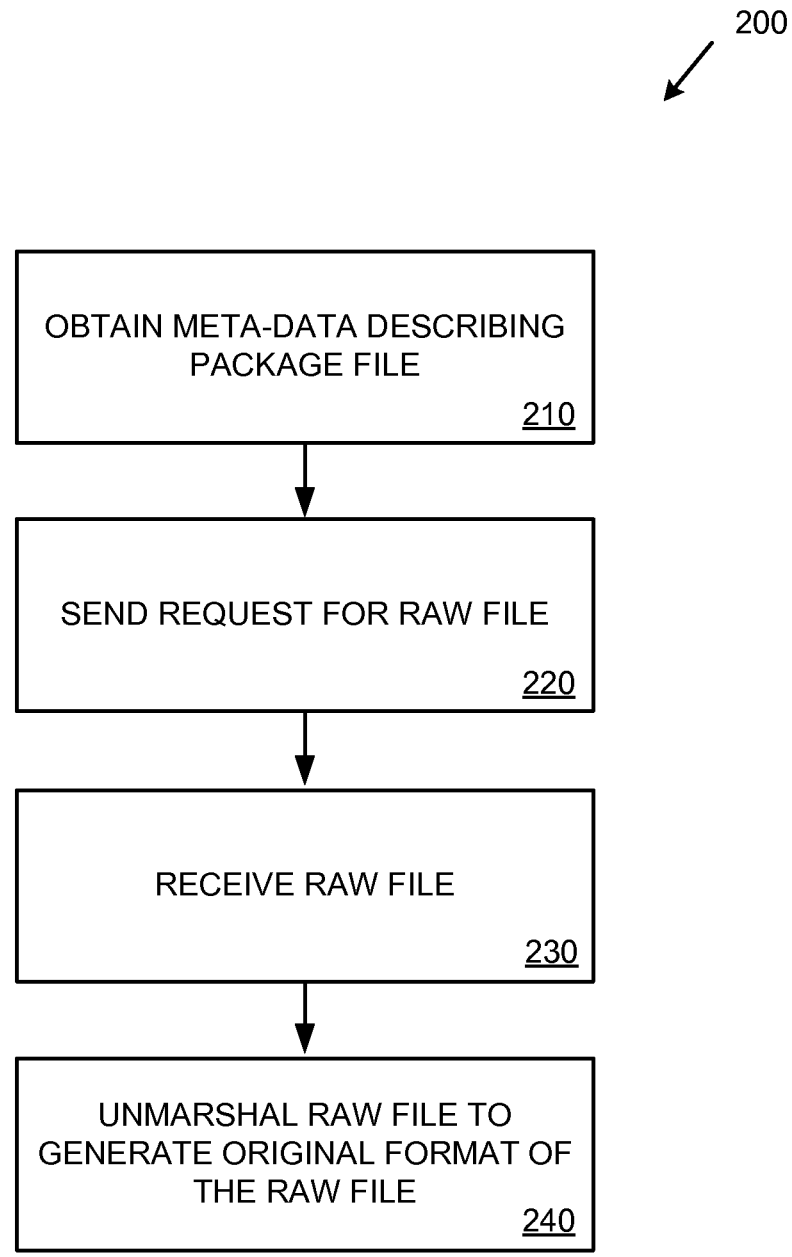
FIG. 2 is a flowchart of an example method for remotely retrieving a raw file from a package file.

FIG. 2 is a flowchart of an example method 200, performed at least in part by a computing device, for remotely retrieving a raw file from a package file. At 210, meta-data describing a package file is obtained. For example, the meta-data can be obtained locally (e.g., from local storage of the computing device), or the meta-data can be obtained from another source (e.g., from a remote storage service, such as from the server environment 110 depicted in FIG. 1). The meta-data describes the raw files stored in the package file (e.g., file identifier, location, compression type, encryption type, etc.).

At 220, a request is sent for the raw file. For example, the request can be sent from the computing device to a remote storage service. The request can be based on the obtained meta-data 210. For example, the meta-data can comprise a location of the raw file within the package file (e.g., starting position and length, a byte range, etc.). The request can comprise an indication of the location of the raw file within the package file.

At 230, the raw file is received by the computing device. For example, the raw file can be downloaded by the computing device from the storage service. The raw file can be stored at the computing device.

At 240, the raw file is unmarshaled by the computing device to generate an original format of the raw file. For example, unmarshalling the raw file can comprise uncompressing the raw file, decrypting the raw file, and/or otherwise transforming the raw file from its archived or packaged state. The resulting original format file can be saved and/or utilized at or by the computing device.

Figure 3:
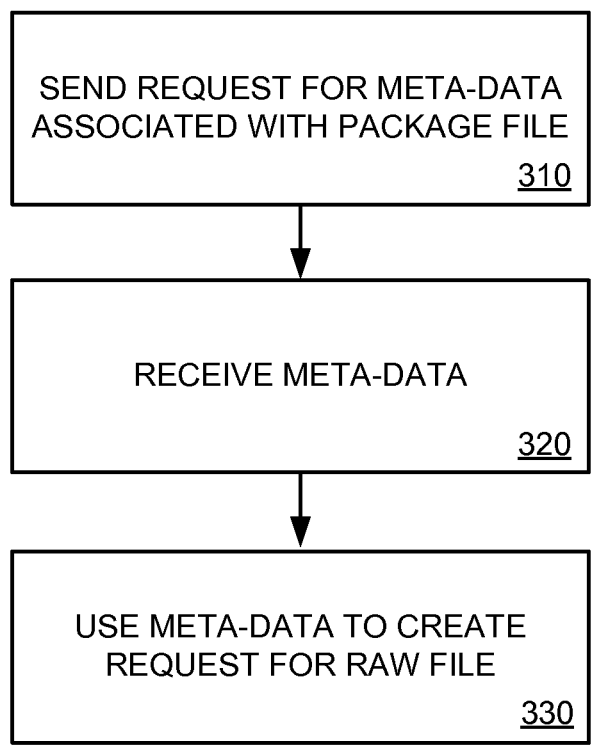
FIG. 3 is a flowchart of an example method for requesting meta-data associated with a package file.

FIG. 3 is a flowchart of an example method 300 for requesting meta-data associated with a package file. At 310, a request is sent by a computing device to a remote storage service for the meta-data associated with the package file. At 320, the meta-data is received by the computing device from the storage service.

At 330, the meta-data is used by the computing device to create a request for a raw file (or for multiple raw files) stored within the package file. For example, the meta-data can be used to generate a list of the individual raw files stored within the archive along with each file's location (e.g., offset and length or byte range), compression type, and/or encryption type. The list of the individual raw files can be used by an automated selection process (e.g., a software application that will utilize the unmarshaled raw files) and/or a manual selection process (e.g., displayed to a user for selection of a raw file to retrieve and unmarshal).

Figure 4:
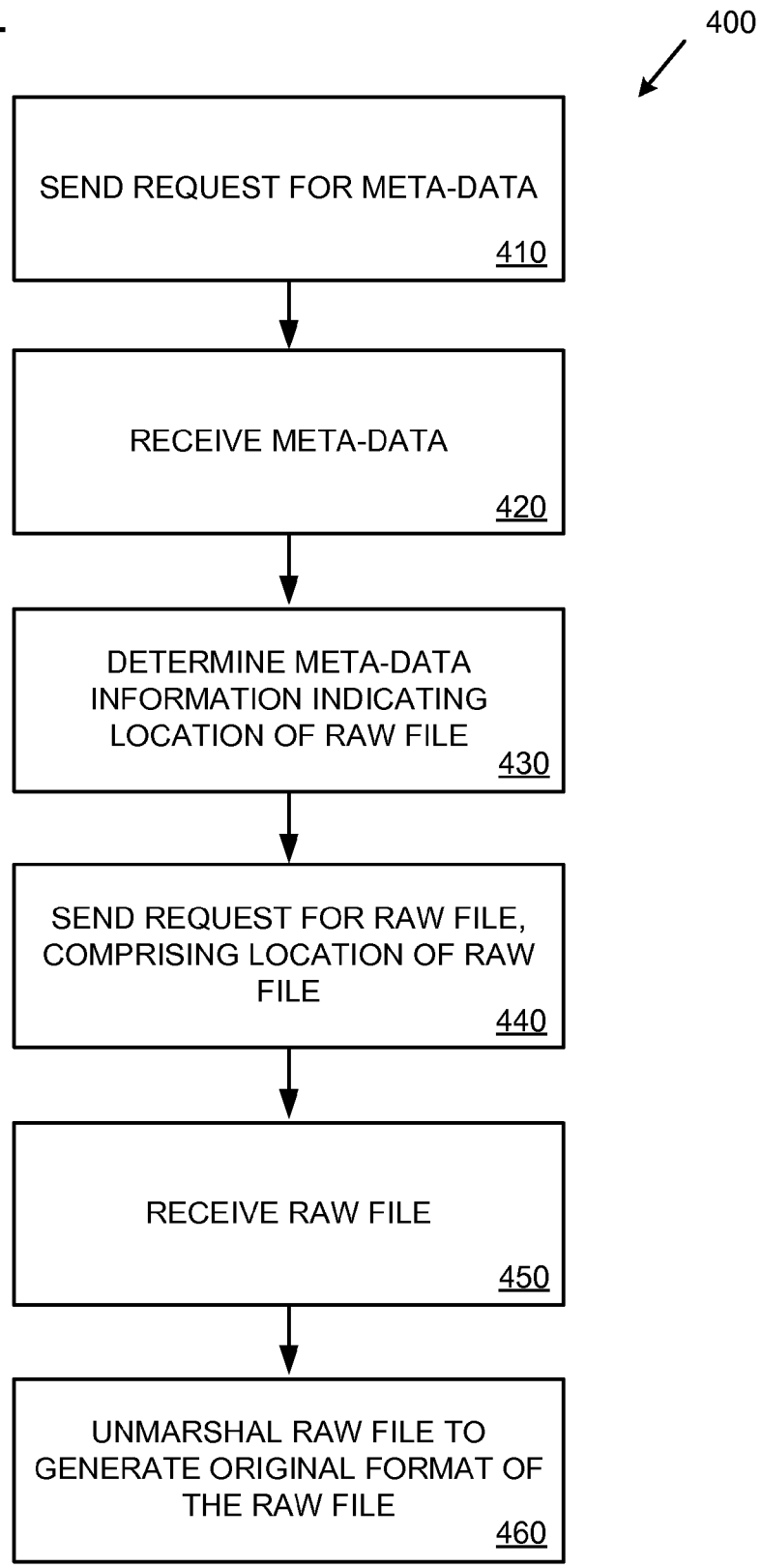
FIG. 4 is a flowchart of an example method for remotely retrieving a raw file from a package file, including requesting meta-data.

FIG. 4 is a flowchart of an example method 400 for remotely retrieving a raw file from a package file, including requesting meta-data. At 410 a request is sent by a computing device to a remote storage service for meta-data associated with the package file. At 420 the meta-data is received by the computing device from the remote storage service.

At 430, meta-data information indicating the location of the raw file within the package file is determined. For example, the meta-data information can comprise a location of the raw file (e.g., offset and length or byte range) within the package file. The meta-data information can also comprise a compression type and/or encryption type for the raw file.

At 440, a request is sent by the computing device to the storage service for the raw file. The request comprises the meta-data information indicating the location of the raw file within the package file. For example, the storage service can use the meta-data information to extract the raw file from the package file (e.g., based on an offset and file size or a byte range) and send the raw file to the computing device in response to the request 440.

At 450, the raw file is received by the computing device. For example, the raw file can be downloaded by the computing device from the storage service. The raw file can be stored at the computing device.

At 460, the raw file is unmarshaled by the computing device to generate an original format of the raw file. For example, unmarshalling the raw file can comprise uncompressing the raw file, decrypting the raw file, and/or otherwise transforming the raw file from its archived or packaged state. The resulting original format file can be saved and/or utilized at or by the computing device.

Providing Raw Files from Package Files

In any of the embodiments described herein, raw files can be extracted from package files and provided to remote computing devices for retrieval or download. For example, the raw files can be retrieved by remote computing devices and unmarshaled.

Figure 5:
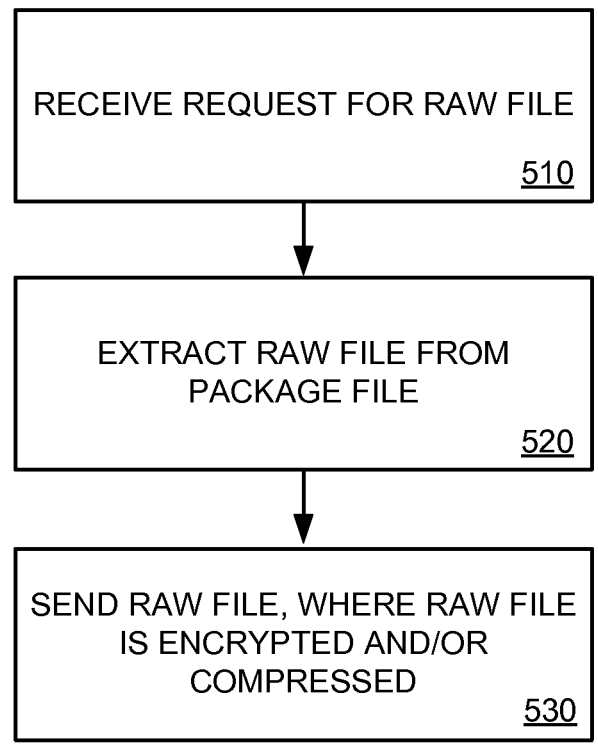
FIG. 5 is a flowchart of an example method for providing a raw file from a package file.

FIG. 5 is a flowchart of an example method 500, for providing a raw file from a package file. For example, the method 500 can be implemented, at least in part, by a storage service, such as the server environment 110 depicted in FIG. 1.

At 510, a request for a raw file is received from a remote computing device. For example, the request can comprise a location of the raw file within the package file (e.g., an offset and file length or a byte range).

At 520, the raw file is extracted from the package file. For example, the raw file can be extracted using a location of the raw file received as part of the request 510.

At 530, the extracted raw file is sent to the remote computing device (e.g., provided to the remote computing device for download). The raw file can be sent to the remote computing device in its archived state (e.g., compressed and/or encrypted). The raw file can be unmarshaled at the remote computing device.

In another embodiment, a method is provided for providing a raw file from a package file. The method can be implemented, at least in part, by a computer server environment. The method comprises receiving, from a remote computing device, a request for meta-data associated with the package file, sending, to the remote computing device, at least a portion of the meta-data, receiving, from the remote computing device, a request for the raw file, where the request for the raw file comprises meta-data information indicating a location of the raw file within the package file (e.g., an offset and length, a byte range, a file identifier, a location of a first lock of the raw file, etc.), extracting the raw file from the package file based at least in part upon the received location of the raw file, and sending the extracted raw file, in its raw archived state, to the remote computing device. The raw file can then be unmarshaled at the remote computing device.

Example Computing Systems

Figure 6:
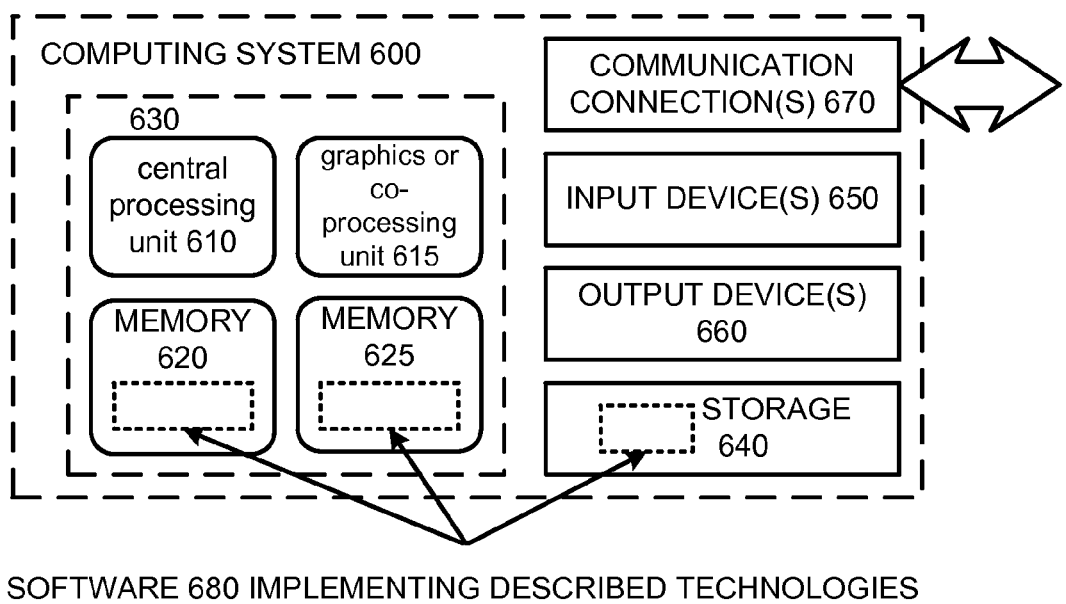
FIG. 6 is a diagram of an example computing system in which some described embodiments can be implemented.

FIG. 6 depicts a generalized example of a suitable computing system 600 in which the described innovations may be implemented. The computing system 600 is not intended to suggest any limitation as to scope of use or functionality, as the innovations may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing system 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing system 600. For video encoding, the input device(s) 650 may be a camera, video card, TV tuner card, or similar device that accepts video input in analog or digital form, or a CD-ROM or CD-RW that reads video samples into the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Cloud Computing Environment

Figure 7:
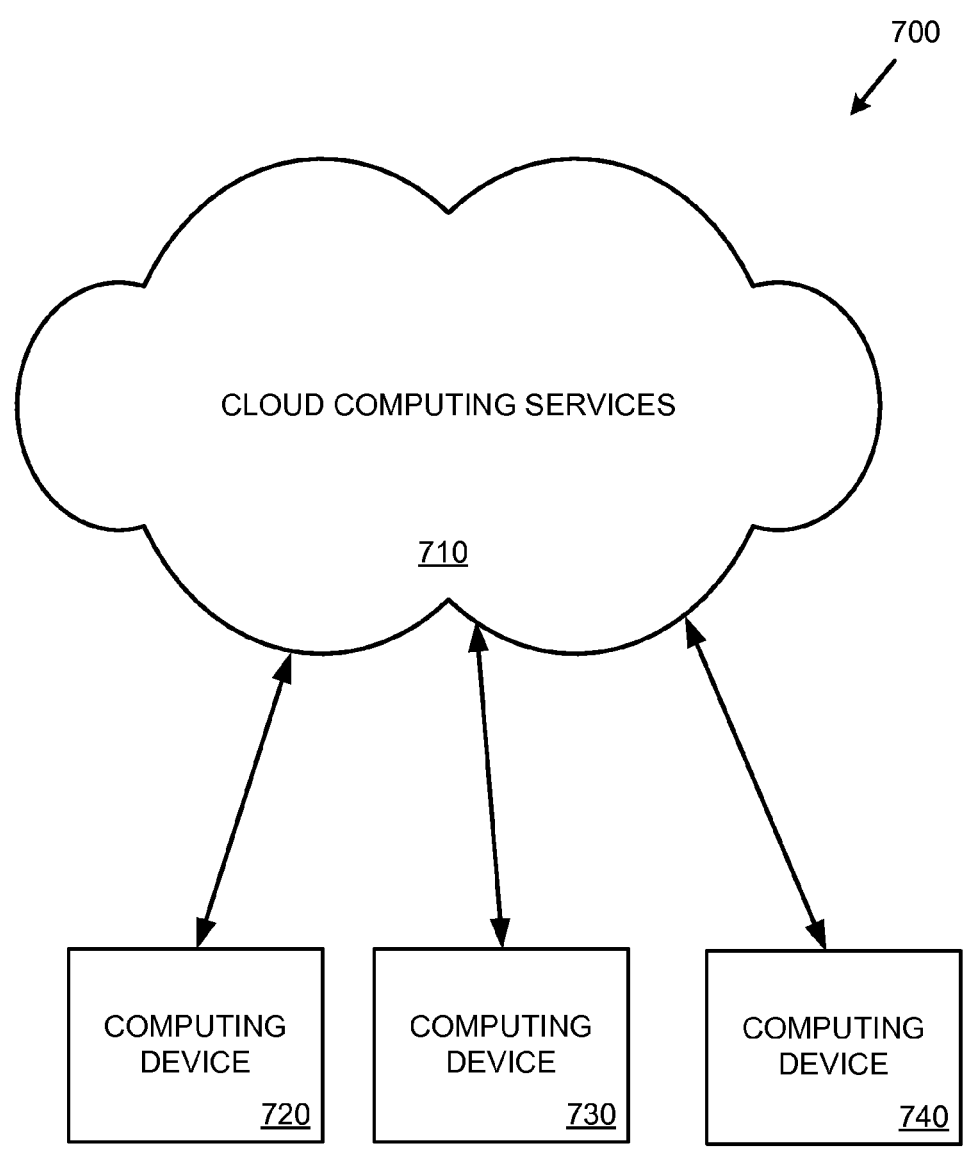
FIG. 7 is an example cloud computing environment that can be used in conjunction with the technologies described herein.

FIG. 7 depicts an example cloud computing environment 700 in which the described technologies can be implemented. The cloud computing environment 700 comprises cloud computing services 710. The cloud computing services 710 can comprise various types of cloud computing resources, such as computer servers, data storage repositories, networking resources, etc. The cloud computing services 710 can be centrally located (e.g., provided by a data center of a business or organization) or distributed (e.g., provided by various computing resources located at different locations, such as different data centers and/or located in different cities or countries).

The cloud computing services 710 are utilized by various types of computing devices (e.g., client computing devices), such as computing devices 720, 730, and 740. For example, the computing devices (e.g., 720, 730, and 740) can be computers (e.g., desktop or laptop computers), mobile devices (e.g., tablet computers or smart phones), or other types of computing devices. For example, the computing devices (e.g., 720, 730, and 740) can utilize the cloud computing services 710 to perform computing operators (e.g., data processing, data storage, and the like).

For example, the cloud computing services 710 can comprise a storage service for providing remote access to data stored by computing devices (e.g., 720, 730, and 740). The storage service can store package files which can be accessed by the computing devices. For example, the computing devices can retrieve meta-data and/or raw files from the storage service. The computing devices can locally unmarshal the raw files. The computing devices can also upload raw files for storage by the storage service.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., non-transitory computer-readable media, such as one or more optical media discs such as DVD or CD, volatile memory components (such as DRAM or SRAM), or nonvolatile memory components (such as flash memory or hard drives)). By way of example and with reference to FIG. 6, computer-readable storage media include memory 620 and 625, and storage 640. As should be readily understood, the term computer-readable storage media does not include communication connections (e.g., 670) such as modulated data signals.

Any of the computer-executable instructions for implementing the disclosed techniques as well as any data created and used during implementation of the disclosed embodiments can be stored on one or more computer-readable storage media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. I therefore claim as my invention all that comes within the scope and spirit of the claims.

I claim:

1. A method, implemented at least in part by a computing device, for remotely retrieving a raw file from a package file, the method comprising:
   by the computing device:
      sending, to a remote service, a request for meta-data associated with the package file, wherein the package file supports storage of a plurality of raw files;
      receiving, from the remote service, the meta-data;
      determining, using the received meta-data, meta-data information indicating a location of the raw file within the package file;
      sending, to the remote service, a request for the raw file, wherein the request for the raw file comprises the meta-data information indicating the location of the raw file;
      receiving, from the remote service, the raw file; and
      unmarshalling the raw file to generate an original format of the raw file, wherein the meta-data comprises, for the raw file stored in the package file:
         a first encryption type for the raw file; and
         a first compression type for the raw file;
      wherein unmarshalling the raw file to generate the original format of the raw file comprises:
         performing a transformation on the raw file, wherein the transformation comprises transcoding the raw file, wherein the raw file is encoded in a first format, and wherein transcoding the raw file comprises:
            decoding the raw file from the first format; and
            re-encoding the raw file in a second format different from the first format;
      wherein the meta-data further comprises meta-data information for a second raw file stored in the package file comprising:
         a second encryption type for the second raw file, wherein the second encryption type is different from the first encryption type; and
         a second compression type for the second raw file, wherein the second compression type is different from the first compression type; and
      wherein the first encryption type for the raw file uses a first encryption algorithm, wherein the second encryption type for the second raw file uses a second encryption algorithm, and wherein the first encryption algorithm and the second encryption algorithm are different encryption algorithms.

2. The method of claim 1 wherein unmarshalling the raw file to generate the original format of the raw file comprises: uncompressing the raw file, decrypting the raw file, or uncompressing and decrypting the raw file.

3. The method of claim 1 wherein the meta-data information indicating the location of the raw file comprises a range of bytes for the raw file within the package file.

4. A method, implemented at least in part by a computing device, for remotely retrieving a raw file from a package file, the method comprising:
   by the computing device:
      obtaining meta-data describing the package file, wherein the meta-data comprises information describing each of a plurality of raw files stored in the package file;
      sending, to a remote service, a request for the raw file based on the meta-data, wherein the raw file is one of the plurality of raw files stored in the package file;
      receiving, from the remote service, the raw file; and
      unmarshalling the raw file to generate an original format of the raw file, wherein unmarshalling the raw file to generate the original format of the raw file comprises:
         performing a transformation on the raw file, wherein the transformation comprises transcoding the raw file, wherein the raw file is encoded in a first format, and wherein transcoding the raw file comprises:
            decoding the raw file from the first format; and
            re-encoding the raw file in a second format different from the first format; and
      storing the original format of the raw file;
      wherein the meta-data comprises, for each of the plurality of raw files stored in the package file:
         an indication of an encryption type for the raw file, wherein the encryption type is selected from a plurality of different available encryption algorithms for the raw file comprising a first encryption algorithm and a second encryption algorithm, wherein the first encryption algorithm and the second encryption algorithm are different encryption algorithms.

5. The method of claim 4 wherein the raw file is compressed, encrypted, or both compressed and encrypted.

6. The method of claim 4 wherein unmarshalling the raw file to generate the original format of the raw file comprises: uncompressing the raw file, decrypting the raw file, or uncompressing and decrypting the raw file.

7. The method of claim 4 wherein meta-data comprises, for each of the plurality of raw files stored in the package file:
   an identifier of the raw file; and a location of the raw file within the package file.

8. The method of claim 7 wherein meta-data further comprises, for each of the plurality of raw files stored in the package file:
   the indication of the encryption type for the raw file and an indication of a compression type for the raw file;
   wherein the indication of the encryption type and the indication of the compression type are independently settable on an individual raw file basis.

9. The method of claim 4 wherein obtaining the meta-data describing the package file comprises:
   sending, to the remote service, a request for the meta-data associated with the package file; and
   receiving, from the remote service, the meta-data.

10. The method of claim 4 wherein the raw file is represented as a range of bytes within the package file, and wherein the meta-data comprises:
    an offset of the raw file within the package file; and
    a length of the raw file.

11. A computer server environment for providing a raw file from a package file, the computer server environment comprising:
    one or more server systems comprising processing units and memory;
    the one or more server systems configured to perform operations comprising:
      receiving, from a remote computing device, a request for the raw file, wherein the raw file is one of a plurality of raw files stored in the package file, wherein the package file is described by meta-data;
      extracting, by the computer server environment, the raw file from the package file; and
      sending, to the remote computing device, the raw file that has been extracted from the package file, wherein the raw file is unmarshaled by the remote computing device, wherein the unmarshalling comprises transcoding the raw file comprising:
        decoding the raw file from a first format; and
        re-encoding the raw file in a second format different from the first format;
      wherein the raw file is compressed, encrypted, or both compressed and encrypted;
      wherein the meta-data further comprises, for each of the plurality of raw files stored in the package file:
        an indication of an encryption type for the raw file;
      wherein the meta-data further comprises:
        for at least one raw file stored in the package file, a first encryption type;
        for at least one other raw file stored in the package file, a second encryption type, wherein the first encryption type is different from the second encryption type; and
      wherein the first encryption type for the one raw file uses a first encryption algorithm, wherein the second encryption type for the one other raw file uses a second encryption algorithm, and wherein the first encryption algorithm and the second encryption algorithm are different encryption algorithms.

12. The computer server environment of claim 11 wherein the raw file is not unmarshaled by the computer server environment.

13. The computer server environment of claim 11 wherein the unmarshalling comprises uncompressing the raw file, decrypting the raw file, or uncompressing and decrypting the raw file.

14. The computer server environment of claim 11 wherein meta-data comprises, for each of the plurality of raw files stored in the package file:
    an identifier of the raw file; and
    a location of the raw file within the package file.

15. The computer server environment of claim 14 wherein the meta-data further comprises, for each of the plurality of raw files stored in the package file:
    the indication of the encryption type for the raw file and an indication of a compression type for the raw file;
    wherein the indication of the encryption type and the indication of the compression type are independently settable on an individual raw file basis.

16. The computer server environment of claim 11 wherein the package file is described by meta-data, and wherein the operations further comprise:
    receiving, from the remote computing device, a request for the meta-data; and
    sending, to the remote computing device, the meta-data.

17. A method, implemented at least in part by a computer server environment, for providing a raw file from a package file, the method comprising:
    by the computer server environment:
      receiving, from a remote computing device, a request for meta-data associated with the package file, wherein the package file supports storage of a plurality of raw files;
      sending, to the remote computing device, at least a portion of the meta-data;
      receiving, from the remote computing device, a request for the raw file, wherein the raw file is stored in the package file, and wherein the request for the raw file comprises meta-data information indicating a location of the raw file within the package file;
      extracting, by the computer server environment, the raw file from the package file based at least in part upon the received location of the raw file; and
      sending, to the remote computing device, the raw file that has been extracted from the package file, wherein the raw file is unmarshaled by the remote computing device, wherein the unmarshalling comprises transcoding the raw file comprising:
        decoding the raw file from a first format; and
        re-encoding the raw file in a second format different from the first format;
      wherein the meta-data associated with the package file comprises, for each raw file stored in the package file:
        an indication of an encryption type for the raw file;
      wherein the meta-data further comprises:
        for at least one raw file stored in the package file, a first encryption type;
        for at least one other raw file stored in the package file, a second encryption type, wherein the first encryption type is different from the second encryption type; and
      wherein the first encryption type for the one raw file uses a first encryption algorithm, wherein the second encryption type for the one other raw file uses a second encryption algorithm, and wherein the first encryption algorithm and the second encryption algorithm are different encryption algorithms.

18. The method of claim 17 wherein the raw file is compressed, encrypted, or both compressed and encrypted.

19. The method of claim 17 wherein the unmarshalling comprises uncompressing the raw file, decrypting the raw file, or uncompressing and decrypting the raw file.

20. The method of claim 17 wherein the meta-data information indicating the location of the raw file comprises:
 a start location of the raw file within the package file; and
 a length of the raw file.

21. The method of claim 17 wherein the meta-data information indicating the location of the raw file comprises a range of bytes for the raw file within the package file.

22. One or more non-transitory computer-readable storage media storing computer-executable instructions for causing a computing device to perform a method for remotely retrieving a raw file from a package file, the method comprising:
 obtaining meta-data describing the package file, wherein the meta-data comprises information describing each of a plurality of raw files stored in the package file;
 determining meta-data information for the raw file from the meta-data, wherein the meta-data information for the raw file comprises a location of the raw file within the package file, wherein the meta-data information for the raw file further comprises:
  a first encryption type for the raw file;
 sending, to a remote service, a request for the raw file based at least in part on the location of the raw file within the package file, wherein the raw file is one of the plurality of raw files stored in the package file;
 receiving, from the remote service, the raw file;
 unmarshalling the raw file to generate an original format of the raw file, wherein unmarshalling the raw file to generate the original format of the raw file comprises performing a transformation on the raw file, wherein the transformation comprises transcoding the raw file, wherein the raw file is encoded in a first format, and wherein transcoding the raw file comprises:
  decoding the raw file from the first format; and
  re-encoding the raw file in a second format different from the first format; and
 storing the original format of the raw file;
 wherein the meta-data further comprises meta-data information for a second raw file stored in the package file comprising:
  a second encryption type for the second raw file, wherein the second encryption type is different from the first encryption type; and
 wherein the first encryption type for the raw file uses a first encryption algorithm, wherein the second encryption type for the second raw file uses a second encryption algorithm, and wherein the first encryption algorithm and the second encryption algorithm are different encryption algorithms.

23. The one or more computer-readable storage media of claim 22 wherein unmarshalling the raw file to generate the original format of the raw file comprises:
 uncompressing the raw file, decrypting the raw file, or uncompressing and decrypting the raw file.

24. The one or more computer-readable storage media of claim 22 wherein the meta-data information for the raw file further comprises:
 an indication of a compression type for the raw file;
 wherein indications of encryption type and indications of compression type are independently settable within the meta-data on an individual raw file basis.

25. The one or more computer-readable storage media of claim 22 wherein obtaining the meta-data describing the package file comprises:
 sending, to a remote service, a request for the meta-data associated with the package file; and
 receiving, from the remote service, the meta-data.

26. The one or more computer-readable storage media of claim 22 wherein the meta-data information indicating the location of the raw file comprises:
 a start location of the raw file within the package file; and
 a length of the raw file.

27. The one or more computer-readable storage media of claim 22 wherein the meta-data information indicating the location of the raw file comprises a range of bytes for the raw file within the package file.

* * * * *